US012654650B2

(12) United States Patent (10) Patent No.: US 12,654,650 B2
Naujoks et al. (45) Date of Patent: Jun. 16, 2026

(54) METHOD, DEVICE, COMPUTER PROGRAM AND COMPUTER-READABLE STORAGE MEDIUM FOR OPERATING A VEHICLE

(71) Applicant: Bayerische Motoren Werke Aktiengesellschaft, Munich (DE)

(72) Inventors: Frederik Naujoks, Munich (DE); Sebastian Hergeth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 223 days.

(21) Appl. No.: 18/550,054

(22) PCT Filed: Jan. 18, 2022

(86) PCT No.: PCT/EP2022/050950
§ 371 (c)(1),
(2) Date: Sep. 11, 2023

(87) PCT Pub. No.: WO2022/218577
PCT Pub. Date: Oct. 20, 2022

(65) Prior Publication Data
US 2024/0149828 A1 May 9, 2024

(30) Foreign Application Priority Data

Apr. 16, 2021 (DE) .................... 10 2021 109 590.5

(51) Int. Cl.
*B60R 25/24* (2013.01)
*G07C 9/00* (2020.01)
(52) U.S. Cl.
CPC .......... *B60R 25/24* (2013.01); *G07C 9/00309* (2013.01); *G07C 2009/00412* (2013.01);
(Continued)

(58) Field of Classification Search
None
See application file for complete search history.

(56) References Cited

U.S. PATENT DOCUMENTS

| 11,099,570 B2 * | 8/2021 | Gurin ................... G05D 1/0088 |
| 11,613,217 B2 * | 3/2023 | Beiser .................... B60L 53/68 |
| | | 701/36 |

(Continued)

FOREIGN PATENT DOCUMENTS

| DE | 102014009450 A1 | 12/2015 |
| DE | 102017222476 A1 | 5/2019 |

(Continued)

OTHER PUBLICATIONS

International Search Report corresponding to International Patent Application No. PCT/EP2022/050950, dated May 18, 2022 (6 pages).

(Continued)

*Primary Examiner* — Davetta W Goins
(74) *Attorney, Agent, or Firm* — Maginot, Moore & Beck LLP

(57) ABSTRACT

A method for operating a motor vehicle includes receiving a first authorization signal for operating the vehicle transmitted from a vehicle key. The method also includes ascertaining whether the vehicle key is located outside the vehicle. If the vehicle key is located outside the vehicle, then it is determined whether a mobile device which is communicatively coupled to the vehicle is located in the vehicle. If a mobile device which is communicatively coupled to the vehicle is located in the vehicle, then it is determined whether the mobile device can be assigned to a person sitting in a driver's seat of the vehicle. If so, then a digital key is generated for the further use of the vehicle, and the vehicle is operated on the basis of the digital key.

21 Claims, 1 Drawing Sheet

(52) U.S. Cl.
CPC .............. *G07C 2009/00793* (2013.01); *G07C 2209/08* (2013.01); *G07C 2209/63* (2013.01)

(56)                    References Cited

U.S. PATENT DOCUMENTS

| | | | | |
|---|---|---|---|---|
| 11,682,248 | B2 * | 6/2023 | Endo ..................... | H04W 12/04 |
| | | | | 340/5.61 |
| 11,714,161 | B2 * | 8/2023 | Lowe ........................ | G01S 5/02 |
| | | | | 455/456.1 |
| 12,198,487 | B2 * | 1/2025 | Tachibana .......... | G07C 9/00571 |
| 12,323,879 | B2 * | 6/2025 | Lundsgaard .......... | H04W 4/027 |
| 2015/0148989 | A1 * | 5/2015 | Cooper ................... | E05F 15/77 |
| | | | | 701/2 |
| 2015/0149042 | A1 | 5/2015 | Cooper et al. | |
| 2020/0151475 | A1 | 5/2020 | Wunsche, III et al. | |
| 2021/0168602 | A1 | 6/2021 | Kim et al. | |

FOREIGN PATENT DOCUMENTS

| | | | |
|---|---|---|---|
| EP | 2837758 | A1 | 2/2015 |
| FR | 3101040 | A1 | 3/2021 |
| KR | 20180078655 | A | 7/2018 |
| WO | 2014052059 | A1 | 4/2014 |
| WO | 2020218627 | A1 | 10/2020 |

OTHER PUBLICATIONS

Written Opinion corresponding to International Patent Application No. PCT/EP2022/050950, dated May 18, 2022 (7 pages).
German Search Report corresponding to German Patent Application No. 10 2021 109 590.5, dated Nov. 11, 2021. (5 pages).

* cited by examiner

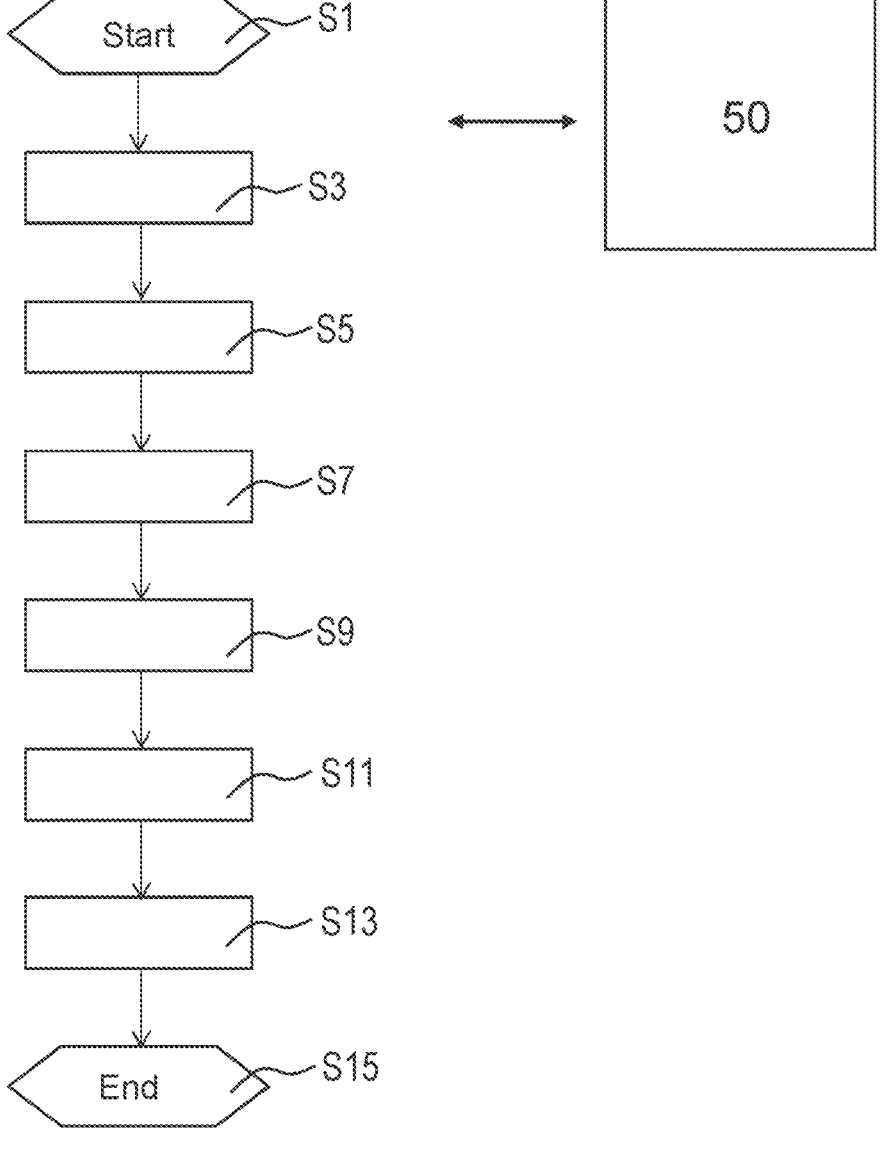

METHOD, DEVICE, COMPUTER PROGRAM AND COMPUTER-READABLE STORAGE MEDIUM FOR OPERATING A VEHICLE

The present application is the U.S. national phase of PCT Application PCT/EP2022/050950 filed on Jan. 18, 2022, which claims priority of German patent application No. 102021109590.5 filed on Apr. 16, 2021, which is incorporated herein by reference in its entirety.

TECHNICAL FIELD

The disclosure relates to the field of operating a vehicle.

BACKGROUND

State-of-the-art vehicles are frequently started-up by means of a vehicle key, which no longer engages mechanically with a lock on the vehicle, but is exclusively electronic. An ignition key of this type simply needs to be carried and, for example, can be left in a trouser pocket.

The fundamental advantage of the disclosure is to permit the reliable operation of a vehicle.

SUMMARY

This advantage is fulfilled by the advantageous configurations disclosed herein.

According to an exemplary method, a first authorization signal for operating the vehicle is received, wherein the first authorization signal is transmitted from a vehicle key. It is ascertained whether the vehicle key, further to the establishment of driving readiness, is located outside the vehicle. If the vehicle key is located outside the vehicle, it is ascertained whether a mobile device which is coupled to the vehicle is located in the vehicle. If a mobile device which is coupled to the vehicle is located in the vehicle, it is ascertained whether the mobile device which is coupled to the vehicle can be assigned to a person sitting in the driver's seat of the vehicle. If the mobile device which is coupled to the vehicle can be assigned to a person sitting in the driver's seat of the vehicle, a digital key is generated for the further use of the vehicle. The vehicle is operated on the basis of the digital key.

The method, in principle, facilitates the possibility for further operation of the vehicle to proceed, if the originally employed vehicle key has left the vehicle. In the case of exclusively electronic vehicle keys, this can occur on a frequent basis. For example, the vehicle key may be present in a pocket of a vehicle passenger. If the latter leaves the vehicle briefly, for example in order to open a garage, or in the event of a brief departure at a rest area, in many vehicles, further travel is not possible. However, by means of the above method, in principle, it is possible for the further operation of the vehicle to proceed, for example in order to drive into the garage or to occupy a parking space.

The first authorization signal, for example, is a signal for unlocking the vehicle.

The vehicle key, for example, is an exclusively electronic key, the mechanical engagement of which with a vehicle lock is not required.

In particular, the establishment of driving readiness signifies that the vehicle engine has been started-up, or that the vehicle is in state in which it will move off, if the gas pedal is actuated.

The mobile device which is coupled to the vehicle is, for example, a smartphone and/or a smartwatch, or similar, and is connected to the vehicle, for example by means of a Bluetooth connection or another wireless connection.

Determination as to whether the vehicle key is located outside the vehicle is executed, for example, by a measurement of a signal strength and/or a signal propagation time, and/or by means of triangulation or other appropriate positional determination methods.

Likewise, determination as to whether the device is located in the vehicle is executed, for example, by a measurement of a signal strength and/or a signal propagation time, and/or by means of triangulation or other appropriate positional determination methods.

According to an optional configuration, the digital key is saved on the mobile device which is coupled to the vehicle. As a result, the mobile device, in principle, at least for a predefined time, can be employed in the manner of a standard and exclusively electronic vehicle key.

According to a further optional configuration, the digital key is cryptographically encrypted.

Operation of the vehicle can be secured as a result. The digital key can be encrypted, for example, by means of "blockchain" technology.

According to a further optional configuration, the digital key assumes a predefined temporal validity.

As described above, the method can be employed in a particularly effective manner for the completion of short journeys such as, for example, the route into a garage, without the vehicle key. For reasons of security, it is thus advantageous that the validity of the vehicle key should be temporally limited, for example to one, two, three or four minutes, or to another appropriate time duration. This time duration can be defined by the driver, for example by means of a setting device in the vehicle. Once this time duration has elapsed, for example, the vehicle will stop, and no further operation thereof will be permitted without the vehicle key.

According to a further optional configuration, the digital key is restricted to a predefined location.

As described above, the method can be employed in a particularly effective manner for the completion of short journeys such as, for example, the route into a garage, without the vehicle key. For reasons of security, it is thus advantageous that the validity of the vehicle key should be geographically limited. The location can be defined by the driver, for example, by means of a setting device in the vehicle. It is thus possible for the method to be restricted to predefined locations, for example to a home address and/or a workplace, and/or to be additionally restricted to predefined radii, for example within a predefined number of kilometers from the specified location.

According to a further optional configuration, it is ascertained whether a mobile device which is coupled to the vehicle can be assigned to a person sitting in the driver's seat of the vehicle, wherein information is received from the mobile device, sensor data are received from an interior sensor and, in accordance with said information and the sensor data, it is ascertained whether the mobile device which is coupled to the vehicle can be assigned to the person sitting in the driver's seat of the vehicle.

Information comprises, for example, an identifier of the device. In this case, sensor data comprise, for example, image data from a camera which are characteristic of the driver's face, and/or data from a seat pressure distribution device of the driver's seat, and/or data from an eye-tracking sensor. For example, the vehicle can learn from previous journeys, provided that a device has been previously coupled, to which sensor data for said device can be matched. These data can then be employed for the execution of a plausibility check as to whether the driver matches the identifier of the device. For example, the driver assigned to device "X" has blue eyes and/or gray hair, and/or is associated with a first seat pressure distribution. This is learned by the vehicle, as the person assigned to the coupled device "X" is simultaneously present in the driver's seat, and these data are saved. These data can then be compared with current sensor data, in order to execute a plausibility check as to whether the same person is present.

Alternatively or additionally, this information comprises, for example, "health data", such as height, weight or similar. In this case, an appropriate characteristic variable can be calculated from sensor data and employed for the execution of a plausibility check. Thus, for example, from the above-mentioned image data from a camera, a height of the driver can be estimated, and/or a weight thereof can be estimated from the seat pressure distribution.

A further aspect is characterized by a vehicle, wherein the vehicle comprises the above-mentioned device.

A further aspect is characterized by a computer program for operating the vehicle, comprising commands which, upon the execution of the computer program by a computer, initiate the execution by the latter of the above-mentioned method.

A further aspect is characterized by a computer-readable storage medium, on which the computer program is saved.

Exemplary embodiments are described in greater detail hereinafter, with reference to the schematic drawing

BRIEF DESCRIPTION OF THE DRAWING

FIG. 1 shows a flow diagram for the operation of a vehicle, and a device that executes at least a portion of the operation of the vehicle.

DETAILED DESCRIPTION

FIG. 1 shows a flow diagram for the operation of a vehicle, and a control device 50 therefor.

The control device 50 is configured to operate a vehicle. To this end, in particular, the control device 50 comprises a computing unit, a program and data memory and, for example, one or more communication interfaces. The program and data memory, and/or the computing unit, and/or the communication interfaces can be configured in one structural unit and/or can be divided between multiple structural units.

The control device 50 can also be described as a device for operating a vehicle.

To this end, in particular, a program is saved on the program and data memory of the control device 50, the flow diagram of which is illustrated in FIG. 1.

The program commences in a step S1, in which variables can optionally be initialized.

In a step S3, a first authorization signal is received for operating the vehicle, wherein the first authorization signal is transmitted from a vehicle key.

The first authorization signal, for example, is a signal for unlocking the vehicle. Alternatively, the first authorization signal is a signal for the start-up of a vehicle engine.

In a step S5, it is ascertained whether the vehicle key, further to the establishment of driving readiness, is located outside the vehicle.

Establishment of driving readiness signifies, in particular, that the vehicle is in a state in which it will move off, if the gas pedal is actuated.

Determination as to whether the vehicle key is located outside the vehicle is executed, for example, by a measurement of a signal strength and/or a signal propagation time, and/or by means of triangulation or other appropriate positional determination methods.

If the vehicle key, further to the establishment of driving readiness, is located inside the vehicle, the vehicle can continue to operate as normal.

If the vehicle key, further to the establishment of driving readiness, is located outside the vehicle, the program proceeds to a step S7.

In step S7, it is ascertained whether a mobile device which is coupled to the vehicle is located in the vehicle.

The mobile device which is coupled to the vehicle is, for example, a smartphone and/or a smartwatch, and/or another terminal device, and is connected to the vehicle, for example by means of a Bluetooth connection or another wireless connection (e.g. a WLAN connection).

Determination as to whether the device is located in the vehicle is executed, for example, by a measurement of a signal strength and/or a signal propagation time, and/or by means of triangulation or other appropriate positional determination methods.

If no mobile device which is coupled to the vehicle is present in the vehicle, for example, any further operation of the vehicle is inhibited. In other words, any further travel of the vehicle is prevented.

If a mobile device which is coupled to the vehicle is present in the vehicle, the method proceeds to a step S9.

In step S9, it is ascertained whether the mobile device which is coupled to the vehicle can be assigned to a person sitting in the driver's seat of the vehicle.

In step S9, for example, information is received from the mobile device, sensor data are received from an interior sensor and, in accordance with said information and the sensor data, it is ascertained whether the mobile device which is coupled to the vehicle can be assigned to the person sitting in the driver's seat of the vehicle.

Information comprises, for example, an identifier of the device. Alternatively or additionally, this information comprises, for example "health data", such as height, weight and/or a pulse rate and/or similar.

Sensor data comprise, for example, image data from a camera which are characteristic of the driver's face, and/or data from a seat pressure distribution device of the driver's seat, and/or data from an eye-tracking sensor.

For example, the vehicle can learn from previous journeys, provided that a device has been previously coupled, to which sensor data for said device can be matched. These data can then be employed for the execution of a plausibility check as to whether the driver matches the identifier of the device. For example, the vehicle saves matching eyes, hair, faces, etc. and/or seat pressure distribution values, together with the respective devices associated therewith. These data can then be compared with current sensor data, in order to execute a plausibility check as to whether the same person is present.

If the mobile device which is coupled to the vehicle cannot be assigned to a person sitting in the driver's seat of the vehicle, for example, any further operation of the vehicle is inhibited.

If the mobile device which is coupled to the vehicle can be assigned to a person sitting in the driver's seat of the vehicle, the method proceeds to a step S11.

In step S11, a digital key is generated for the further use of the vehicle.

The digital key is saved, for example, on the mobile device which is coupled to the vehicle.

The digital key is, for example, cryptographically encrypted (e.g. by means of blockchain technology).

The digital key assumes, for example, a predefined temporal validity, for example an adjustable number of minutes.

The digital key is, for example, restricted to a predefined location.

In step S13, the vehicle is operated on the basis of the digital key. In other words, the vehicle can be operated as normal, provided that the digital key is valid. Further travel, or similar, is thus possible by means of the digital key.

In a step S15, the program is terminated and, optionally, can then be restarted.

In particular, the method is executed with no change of terminal status. In other words, further to any switch-off of ignition, the vehicle key must again be employed for authorization purposes.

By means of the program described, it is possible, for example, for the further operation of the vehicle to proceed, if the vehicle key is located outside the vehicle.

The invention claimed is:

1. A method for operating a motor vehicle, comprising: receiving a first authorization signal for operating the vehicle, wherein the first authorization signal is transmitted from a vehicle key; ascertaining whether the vehicle key is located outside the vehicle; if the vehicle key is located outside the vehicle, then ascertaining whether a mobile device which is communicatively coupled to the vehicle is located in the vehicle; if a mobile device which is communicatively coupled to the vehicle is located in the vehicle, then ascertaining whether the mobile device can be assigned to a person sitting in a driver's seat of the vehicle; if the mobile device can be assigned to the person sitting in the driver's seat of the vehicle, then generating a digital key for the further use of the vehicle; and operating the vehicle on the basis of the digital key.

2. The method as claimed in claim 1, wherein the digital key is saved on the mobile device.

3. The method as claimed in claim 2, wherein the digital key is associated with a predefined temporal validity.

4. The method as claimed in claim 3, wherein a validity of the digital key is restricted to a predefined geographical area.

5. The method as claimed in claim 2, wherein the digital key is cryptographically encrypted.

6. The method as claimed in claim 5, wherein a validity of the digital key is restricted to a predefined geographical area.

7. The method as claimed in claim 1, wherein the digital key is cryptographically encrypted.

8. The method as claimed in claim 1, wherein the digital key is associated with a predefined temporal validity.

9. The method as claimed in claim 8, wherein a validity of the digital key is restricted to a predefined geographical area.

10. The method as claimed in claim 1, wherein a validity of the digital key is restricted to a predefined geographical area.

11. The method as claimed in claim 10, wherein the predefined geographical area includes locations within a predefined distance from at least one specified geographical location.

12. The method as claimed in claim 11, wherein the at least one specified geographical location is selected by the person sitting in the driver's seat.

13. The method as claimed in claim 1, wherein ascertaining whether the mobile device can be assigned to the person sitting in the driver's seat of the vehicle comprises: receiving information from the mobile device; receiving sensor data from an interior sensor, and ascertaining whether the mobile device can be assigned to the person sitting in the driver's seat of the vehicle based at least in part on said information and the sensor data.

14. A device for operating a vehicle, wherein the device is configured to execute the method as claimed in claim 1.

15. A vehicle, wherein the vehicle comprises the device as claimed in claim 14.

16. A non-transitory computer-readable storage medium on which a computer program is saved, the computer program comprising instructions, which when executed by a computer, cause performance of the method of A non-transitory computer-readable storage medium on which a computer program is saved, the computer program comprising instructions, which when executed by a computer, cause performance of the method of claim 1.

17. A motor vehicle configured to: receive a first authorization signal for operating the vehicle, wherein the first authorization signal is transmitted from a vehicle key; ascertain whether the vehicle key is located outside the vehicle; if the vehicle key is located outside the vehicle, then ascertain whether a mobile device which is communicatively coupled to the vehicle is located in the vehicle; if a mobile device which is communicatively coupled to the vehicle is located in the vehicle, then ascertain whether the mobile device can be assigned to a person sitting in a driver's seat of the vehicle; if the mobile device can be assigned to the person sitting in the driver's seat of the vehicle, then generate a digital key for further use of the vehicle; and operate the vehicle on the basis of the digital key.

18. The motor vehicle as claimed in claim 17, wherein the digital key is saved on the mobile device.

19. The motor vehicle as claimed in claim 17, wherein the digital key is associated with a predefined temporal validity.

20. The motor vehicle as claimed in claim 17, wherein a validity of the digital key is restricted to a predefined geographical area.

21. The motor vehicle as claimed in claim 17, wherein the vehicle is configured to ascertain whether the mobile device can be assigned to the person sitting in the driver's seat of the vehicle by: receiving information from the mobile device; receiving sensor data from an interior sensor, and ascertaining whether the mobile device can be assigned to the person sitting in the driver's seat of the vehicle based at least in part on said information and the sensor data.

* * * * *